US 12,454,810 B2
Oct. 28, 2025

(12) United States Patent
Hisada et al.

(54) DRIVE TRANSMISSION DEVICE AND CONSTRUCTION MACHINE

(71) Applicant: Nabtesco Corporation, Tokyo (JP)

(72) Inventors: Kazuki Hisada, Tokyo (JP); Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 895 days.

(21) Appl. No.: 17/675,417

(22) Filed: Feb. 18, 2022

(65) Prior Publication Data

US 2022/0316183 A1 Oct. 6, 2022

(30) Foreign Application Priority Data

Mar. 31, 2021 (JP) ................................. 2021-061539
Jun. 15, 2021 (JP) ................................. 2021-099506

(51) Int. Cl.
*F16H 37/08* (2006.01)
*E02F 9/20* (2006.01)

(52) U.S. Cl.
CPC ............ *E02F 9/207* (2013.01); *E02F 9/2025* (2013.01); *E02F 9/2095* (2013.01); *F16H 37/08* (2013.01)

(58) Field of Classification Search
CPC .................. E02F 3/42; F16H 1/32–2001/328
USPC ........................................ 475/225, 221, 162
See application file for complete search history.

(56) References Cited

U.S. PATENT DOCUMENTS

| 1,399,019 | A | * | 12/1921 | Krohn | .................. | B60K 17/046 |
| | | | | | | 475/221 |
| 4,893,525 | A | * | 1/1990 | Gabor | ..................... | F16H 48/08 |
| | | | | | | 475/225 |
| 5,536,219 | A | * | 7/1996 | Umemoto | .............. | B60K 17/20 |
| | | | | | | 475/225 |
| 8,517,883 | B2 | * | 8/2013 | Gassmann | .............. | F16H 48/30 |
| | | | | | | 475/214 |
| 10,683,920 | B2 | * | 6/2020 | Palfai | ........................ | F16D 7/02 |

(Continued)

FOREIGN PATENT DOCUMENTS

| CN | 105569108 | A | | 5/2016 | | |
| CN | 112900535 | A | * | 6/2021 | .............. | E02F 3/382 |
| JP | 62-032828 | U | | 2/1987 | | |

(Continued)

OTHER PUBLICATIONS

Extended European Search Report dated Aug. 26, 2022, issued in corresponding European Patent Application No. 22157268.8 (19 pgs.).

(Continued)

*Primary Examiner* — Sherry L Estremsky
(74) *Attorney, Agent, or Firm* — Pillsbury Winthrop Shaw Pittman, LLP

(57) ABSTRACT

A drive transmission device according to one embodiment of the disclosure includes a single differential unit to which rotation of a motor is transmitted and two speed reducers each having an operation output shaft that is coupled to the differential unit and a carrier that changes a speed of the rotation of the operation output shaft and outputs the rotation. The two speed reducers are arranged such that they are opposed to each other along a second rotation axis, and the operation output shaft and the carrier in each speed reducer are aligned in the second rotation axis direction.

4 Claims, 5 Drawing Sheets

(56) References Cited

U.S. PATENT DOCUMENTS

| | | | |
|---|---|---|---|
| 10,895,306 B2* | 1/2021 | Tamura | F16H 55/06 |
| 2014/0213409 A1 | 7/2014 | Yoon | |

FOREIGN PATENT DOCUMENTS

| | | |
|---|---|---|
| JP | 63-300131 A | 12/1988 |
| JP | 2019-158051 A | 9/2019 |

OTHER PUBLICATIONS

Notice of Reasons for Refusal dated Jan. 7, 2025, issued in corresponding Japanese Patent Application No. 2021-099506 with English translation (10 pgs.).

\* cited by examiner

DRIVE TRANSMISSION DEVICE AND CONSTRUCTION MACHINE

CROSS-REFERENCE TO RELATED APPLICATIONS

This application is based on and claims the benefit of priority from Japanese Patent Application Serial Nos. 2021-061539 (filed on Mar. 31, 2021) and 2021-099506 (filed on Jun. 15, 2021), the contents of which are incorporated herein.

TECHNICAL FIELD

The present disclosure relates to a drive transmission device and a construction machine.

BACKGROUND

Construction machines such as an excavator includes a self-propelled undercarriage, a slewable upper structure provided on top of the undercarriage. The upper structure includes a cab where an operator hoards. One end of an operating unit is rotatably (swingably) coupled to the slewable upper structure. The operating unit includes, for example, a boom, an arm rotatably coupled to the boom, and a bucket rotatably coupled to the arm. One end of the arm is coupled to the other end of the boom facing away from the slewable upper structure. The bucket is rotatably coupled to the other end of the arm facing away from the boom.

In many cases, a hydraulic actuator having a linear motion mechanism is provided as a drive transmission device in the coupling portion between the slewable upper structure and the boom, the coupling portion between the boom and the arm, and the coupling portion between the arm and the bucket. The slewable upper structure is rotated relative to the undercarriage, and the boom, arm, and bucket are swingably moved by driving the hydraulic actuators. In recent years, electrification of construction machinery is desired from the viewpoint of structural simplification. It has been proposed to use electric actuators as the drive transmission devices. For example, instead of a hydraulic actuator, use of an electric cylinder of a linear motion mechanism having a ball-screw type speed changer (speed reducer) provided therein is disclosed (for example, Japanese Patent Application Publication No. Sho. 63-300131).

Each coupling portion of construction machines tends to be heavily loaded due to its usage environment. For this reason, the speed changer in particular needs to have sufficient mechanical strength to withstand the heavy load. To address this, the speed change unit has become large and the drive transmission device as a whole has become large in size.

SUMMARY

The present disclosure provides a drive transmission device and a construction machine with a sufficient mechanical strength while accomplishing a reduced size.

A drive transmission device according to one aspect of the disclosure includes: a single transmission portion to which rotation of a drive source generating a rotational force is transmitted; and two speed changers each having an input shaft that is coupled to the transmission portion and an output shaft that changes a speed of rotation of the input shaft and outputs the rotation. The input shaft and the output shaft are aligned in a same rotation axis direction and the two speed changers are opposed each other in the rotation axis direction.

With this configuration, it is possible to, for the single transmission portion, arrange the two speed changers that transmit rotation of the transmission portion in a space-saving manner, which results in the size reduction of the drive transmission device. By providing the two speed changers, the load can be distributed to these two speed changers, and therefore it is possible to obtain a sufficient mechanical strength for a drive transmission device.

In the above drive transmission device, the transmission portion may be disposed between the two speed changers.

In the drive transmission device, the transmission portion may include a differential unit that includes a ring gear to which the rotation of the drive source is transmitted. The input shaft may be coupled to a drive shaft of the differential unit.

In the drive transmission device, an overload protection device connecting the input shafts of the two speed changers may be provided. The overload protection device rotates the input shafts relatively to each other when a difference in torque between the input shafts exceeds a predetermined value.

In the drive transmission device, the two speed changers each include at least one crankshaft that receives the rotation of the input shaft and rotates about another rotation axis parallel to the rotation axis direction of the input shaft. The two speed changers may function as eccentric oscillating type speed changers that each decelerate the rotation of the crankshaft and transmit the decelerated rotation to the output shaft so that the output shaft is rotated at a reduced speed compared to the input shaft.

In the drive transmission device, the crankshaft may include two or more crankshafts. The drive transmission device may further include: an external teeth member having external teeth that are oscillatory rotated about the rotation axis by the crankshafts; and a casing having internal teeth that mesh with the external teeth. The output shaft may rotatably support the crankshafts and be rotatably supported by the casing via a bearing. The output shaft may be a carrier that is rotated relative to the casing at a reduced speed by the crankshafts.

A drive transmission device according to yet another aspect of the disclosure includes: a differential unit that includes a ring gear to which rotation of a motor is transmitted; and two speed changers flanking the differential unit. The two speed changers each include: an input shaft coupled to a drive shaft of the differential unit; an output shaft changing a speed of rotation of the input shaft and outputting the rotation; and at least one crankshaft receiving the rotation of the input shaft and rotating about a rotation axis parallel to a rotation axis direction. The two speed changers function as eccentric oscillating type speed reducers that each decelerate the rotation of the crankshaft and transmit the decelerated rotation to the output shaft so that the output shaft is rotated at a reduced speed compared to the input shaft.

With this configuration, the rotation of the motor can be transmitted to the two speed changers via the single transmission portion. It is also possible to arrange the two speed changers and the singe transmission portion in a space-saving manner, which results in the size reduction of the drive transmission device. By providing the two speed changers, the load can be distributed to these two speed changers, and therefore it is possible to obtain a sufficient mechanical strength for a drive transmission device. The speed changer includes at last one crankshaft and is an eccentric oscillating type reducer that decelerates the rotation of the crankshaft and transmits the decelerated rotation to the output shaft so that the output shaft is rotated at a reduced speed compared to the input shaft. Therefore, it is possible to increase the contact ratio between the gears of the speed changer, which improves the resistance of the drive transmission device against overloads and impact loads.

A construction machine according to another aspect of the disclosure includes: a first member having a drive source that generates a rotational force; and a second member coupled to the first member via a drive transmission device such that the second member is rotatable about a rotation axis. The drive transmission device includes a transmission portion to which a rotational force of the drive source is transmitted and two speed changers changing a speed of rotation of the transmission portion and outputting the rotation to the second member. The two speed changers each include an input shaft coupled to the transmission portion and an output shaft coupled to the second member. The input shaft and the output shaft are aligned along the rotation axis, and the two speed changers are opposed to each other in the rotation axis direction.

With this configuration, the coupling portion between the first member and the second member can be reduced in size. Even when a load is applied to the first member or the second member, this load is distributed to the two speed changers, so that the mechanical strength of the drive transmission device can be sufficiently ensured. It is possible to improve the resistance to overload and impact load on the coupling portion between the first member and the second member.

The above drive transmission device and construction machine can secure sufficient mechanical strength while their sizes can be reduced

DESCRIPTION OF THE EMBODIMENTS

Figure 1:
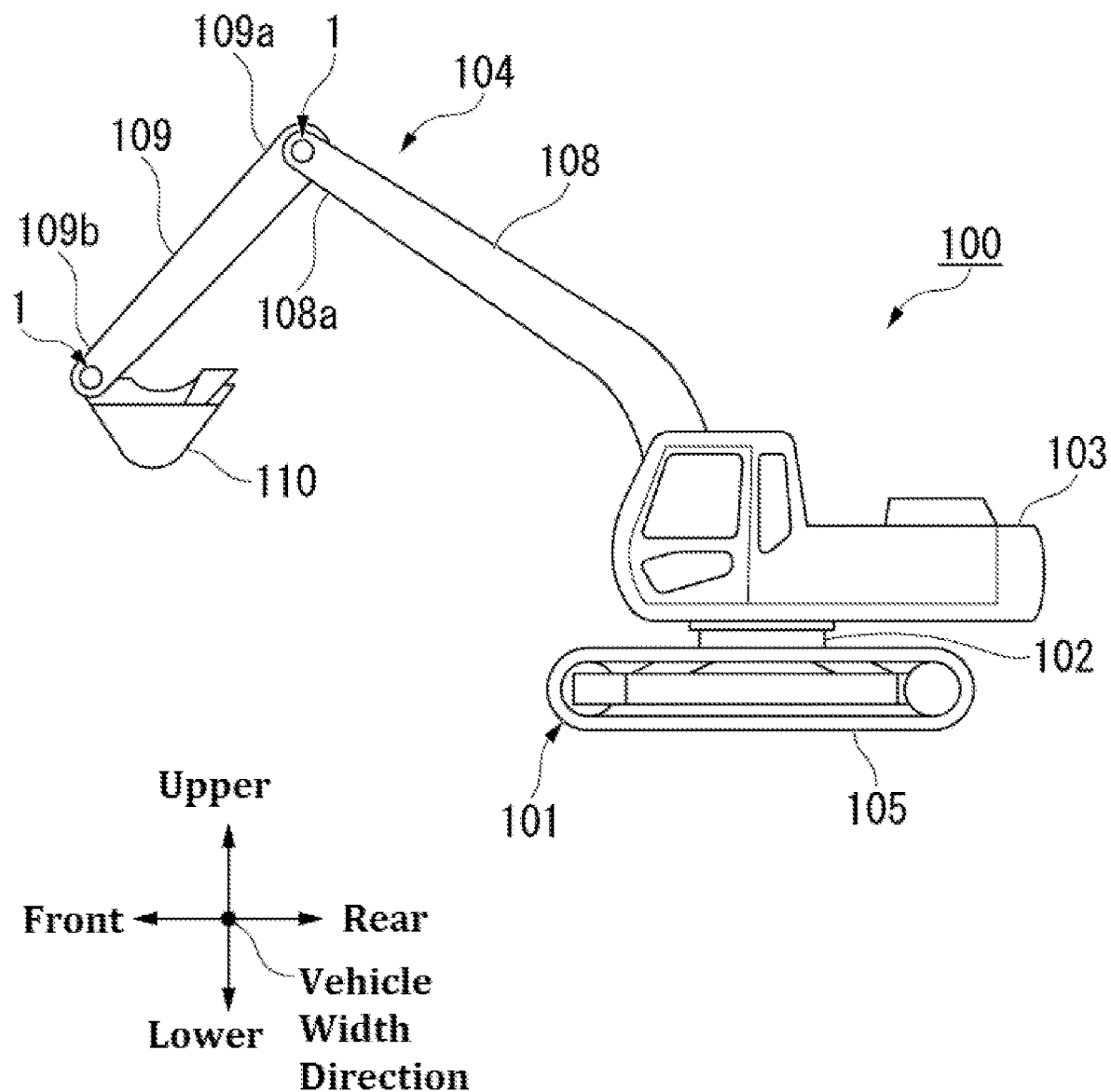
FIG. 1 schematically illustrates a configuration of an excavator according to an embodiment of the present disclosure, viewed from the side.

The following describes embodiments of the present disclosure with reference to the drawings.
<Excavator>
FIG. 1 schematically illustrates an excavator 100, which is an embodiment of a construction machine according to one aspect of the disclosure, viewed from the side. In the following description, a front direction to which an operator of the excavator 100 faces is simply referred to as the front. The opposite side to the front in the horizontal direction is referred to as the rear. The upper and lower directions with the excavator 100 placed on a road surface is simply referred to as the vertical direction. A direction orthogonal to the front-rear direction and the vertical direction is referred to as a vehicle width direction. FIG. 1 shows the excavator 100 as viewed from the vehicle width direction.

As shown in FIG. 1, the excavator 100 includes a self-propelled undercarriage 101, a slewable upper structure 103 that is provided on top of the undercarriage 101 via a sewing mechanism 102 and slews or rotates relative to the undercarriage 101, and an operating unit 104 provided on the slewable upper structure 103. The undercarriage 101 and the slewing mechanism 102 are driven, for example, by an unshown electric motor with a reducer. The traveling body 101 includes, for example, two continuous tracks 105 arranged side by side in the vehicle width direction. The configurations are not limited to this, and wheels or the like may be used instead of the continuous tracks 105.

The operating unit 104 includes a boom 108 and arm 109 extending in the front-rear direction, and a bucket 110. The boom 108, the arm 109, and the bucket 110 are rotatably connected to each other via drive transmission devices 1. Specifically, one end of the boom 108 (this end of the boom 108 in the longitudinal direction and the drive transmission device 1 provided at this end are not shown in FIG. 1) in the longitudinal direction is rotatably coupled to the slewable upper structure 103 via the drive transmission device 1. One end 109a of the arm 109 in the longitudinal direction is rotatably coupled to the other end 108a of the boom 108 in the longitudinal direction via the drive transmission device 1. The bucket 110 is rotatably coupled to the other end 109b of the arm 109 in the longitudinal direction via the drive transmission device 1. The drive transmission devices 1 provided in the above sections all have the same configuration. Therefore, in the following description, only the drive transmission device 1 that couples the bucket 110 to the other end 109b in the longitudinal direction of the arm 109 will be described. Description of the other drive transmission devices 1 will be hereunder omitted.

Figure 2:
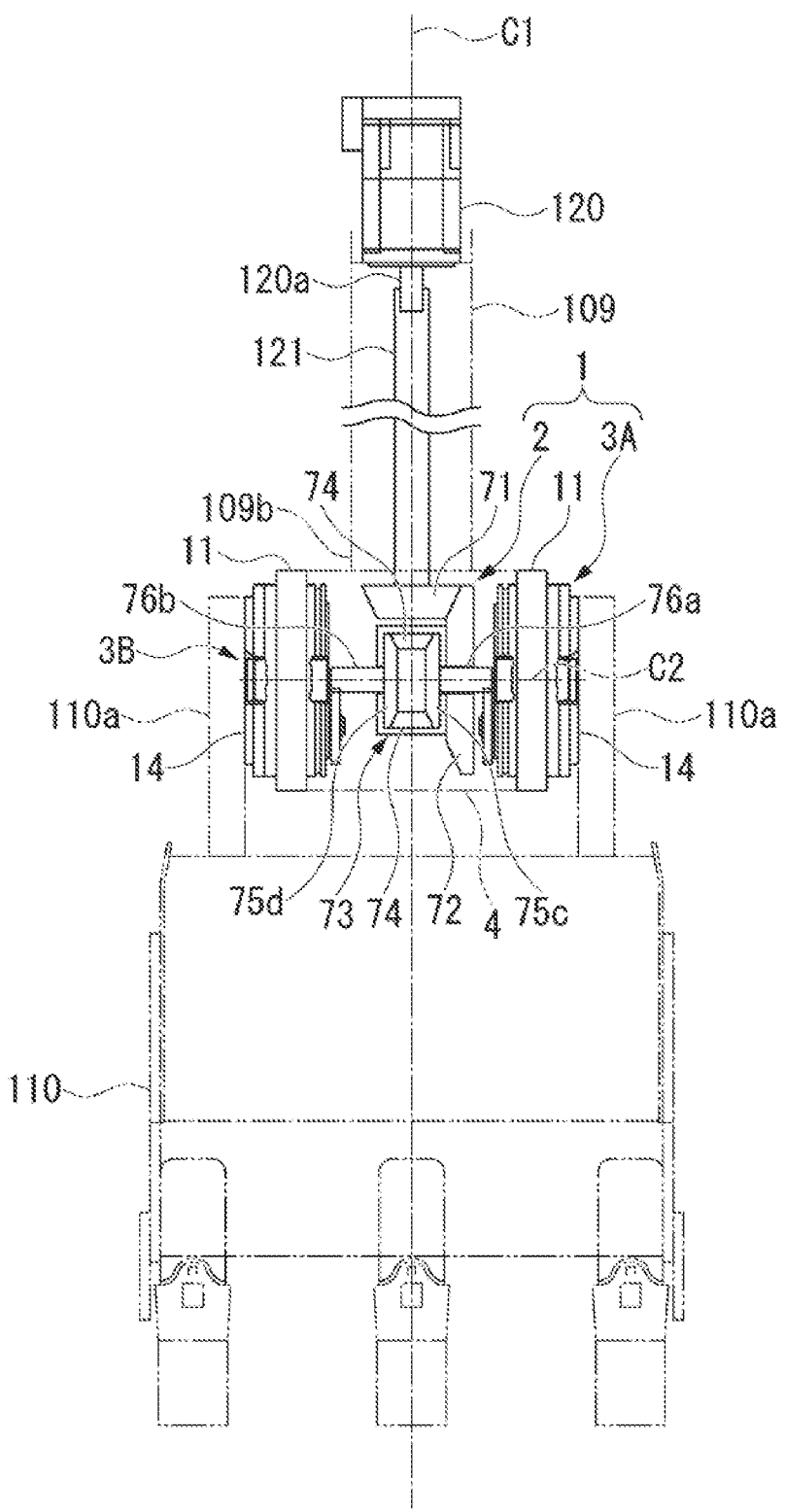
FIG. 2 schematically illustrates a coupling portion in detail between an arm and a bucket in a first embodiment of the disclosure.

FIG. 2 schematically illustrates the coupling portion between the arm 109 and the bucket 110 in detail. In FIG. 2, the arm 109 and the bucket 110 are shown by a dashed-two dotted line for the sake of clarity. As shown in FIG. 2, the arm 109 includes a motor 120 (an example of the drive source or motor in the claims) installed therein. The rotational force of the motor 120 is transmitted to the bucket 110 via the drive transmission device 1. That is, the arm 109 is an example of the first member in the claims. The bucket 110 is an example of the second member in the claims.

The motor 120 is, for example, a so-called electric motor driven by electric power of an external power source (battery) provided in the slewable upper structure 103. As the motor 120, various electric motors such as a so-called brushed motor and a brushless motor can be adopted. The motor 120 is disposed such that a motor shaft 120a rotatable about a first rotation axis C1 faces the bucket 110. The first rotation axis C1 of the motor shaft 120a and the longitudinal direction of the arm 109 coincide with each other.

First Embodiment

<Drive Transmission Device>
The drive transmission device 1 is disposed on the second rotation axis C2 (an example of the rotation axis in the claims) of the bucket 110 relative to the arm 109. On the second rotation axis C2, an attachment bracket 110a of the bucket 110 is arranged on each side of the drive transmission device 1. By fixing these attachment brackets 110a to the drive transmission device 1, the bucket 110 becomes rotatable about the second rotation axis C2 relative to the arm 10).

The drive transmission device 1 includes a differential unit 2 housed in a housing 4 fixed to the other end 109*b* in the longitudinal direction of the arm 109, and two speed reducers 3A and 3B (first speed reducer 3A and second speed reducer 3B) arranged on each side of the differential unit 2 and coupled to the differential unit 2. Rotation axes of the two speed reducers 3A and 3B are parallel to the second rotation axis C2. In the following description, the direction parallel to the second rotation axis C2 may be referred to as an axial direction. The rotational direction about the second rotation axis C2 may be referred to as a circumferential direction. The direction orthogonal to the axial direction and the circumferential direction may be referred to as a radial direction.

<Differential Unit>

Figure 3:
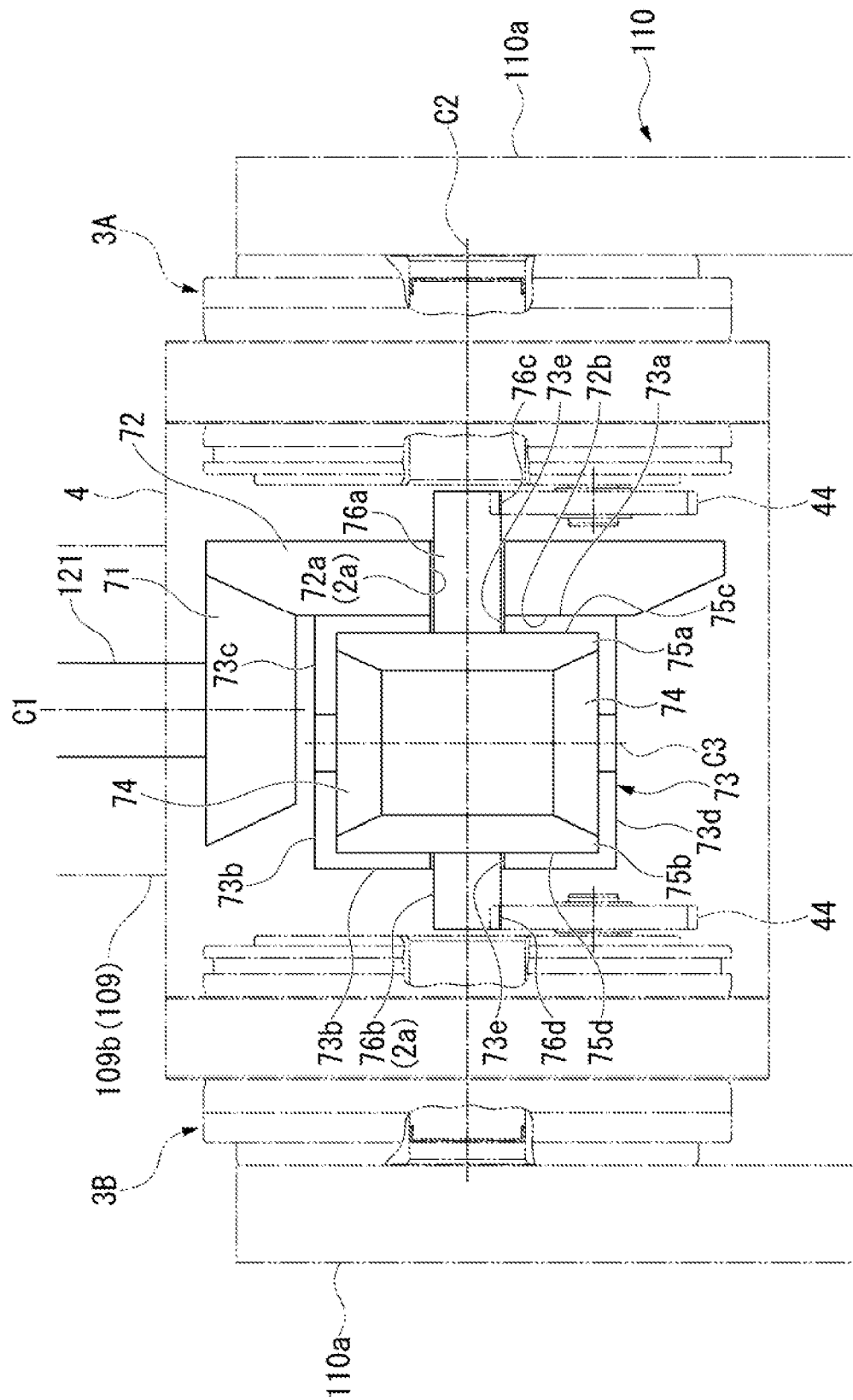
FIG. 3 schematically illustrates a configuration of a differential unit in the first embodiment.

FIG. 3 schematically shows the configuration of the differential unit 2. The differential unit 2 is coupled to the motor shaft 120*a* via a transmission shaft 121. The differential unit 2 includes a first bevel gear 71 that is provided at an end of the transmission shaft 121 opposite to the motor 120 and rotates about the first rotation axis C1, a second bevel gear 72 (an example of the ring gear in the claims) meshed with the first bevel gear 71, a differential case 73 fixed to the second bevel gear 72, a pinion gear 74 rotatably supported by the differential case 73 such that it protrudes from the differential case 73, and a pair of side gears 75*a* and 75*b* (first side gear 75*a*, second side gear 75*b*) meshed with the pinion gear 74.

The second bevel gear 72 rotates about the second rotation axis C2. An insertion hole 72*a* through which a first operation output shaft 76*a*, which will be described later, penetrates is formed in the radial center of the second bevel gear 72. The differential case 73 is fixed to an end surface 72*b* of the second bevel gear 72 situated closer to the first bevel gear 71. The differential case 73 is formed in a square frame shape. The differential case 73 includes two side surfaces 73*a* and 73*b* (first side surface 73*a* and second side surface 73*b*) opposed to each other in the axial direction, and two side surfaces 73*c* and 73*d* (third side surface 73*c* and fourth side surface 73*d*) opposed to each other and their planar direction are orthogonal to the planar direction of the side surfaces 73*a* and 73. Of the four side surfaces 73*a* to 73*d* the outer side of the first side surface 73*a* is fixed to the end surface 72*b* situated closer to the first bevel gear 71.

A pinion gear 74 is respectively provided on the third side surface 73*c* and the fourth side surface 73*d* The pinion gear 74 is supported by the side surfaces 73*c* and 73*d* rotatably about the third rotation axis C3 that extends orthogonal to the axial direction. The pinion gear 74 is also rotatable together with the differential case 73 about the second rotation axis C2.

The pair of side gears 75*a* and 75*b* are arranged on each side of the pinion gear 74. That is, of the pair of side gears 75*a* and 75*b*, the first side gear 75*a* is disposed coaxially with the second rotation axis C2 and on inner side of the first side surface 73*a* of the differential case 73. Of the pair of side gears 75*a* and 75*b*, the second side gear 75*b* is disposed coaxially with the second rotation axis C2 and on inner side of the second side surface 73*b* of the differential case 73.

One end of the first operation output shaft 76*a* is provided on the end surface 75*c* of the first side gear 75*a* situated closer to the first side surface 73*a*. The first operation output shaft 76*a* is arranged coaxially with the second rotation axis C2. The other end of the first operation output shaft 76*a* extends through the insertion hole 73*e* formed in the first side surface 73*a* and the insertion hole 72*a* of the second bevel gear 72 and protrudes out. That is, the first side gear 75*a* is rotatably supported by the first side surface 73*a* of the differential case 73. At the other end of the first operation output shaft 76*a*, a teeth portion 76*c* that meshes with the first speed reducer 3A of the two speed reducers 3A and 3B is formed on the outer peripheral surface.

One end of the second operation output shaft 76*b* is provided on the end surface 75*d* of the second side gear 75*b* situated closer to the second side surface 73*b*. The second operation output shaft 76*b* is arranged coaxially with the second rotation axis C2. The other end of the second operation output shaft 76*b* extends through the insertion hole 73*e* formed in the second side surface 73*b* and protrudes out. That is, the second side gear 75*b* is rotatably supported by the second side surface 73*b* of the differential case 73. At the other end of the second operation output shaft 76*b*, a teeth portion 76*d* that meshes with the second speed reducer 3B of the two speed reducers 3A and 3B is formed on the outer peripheral surface. As described above, the operation output shafts 76*a* and 76*b* form a part of the speed reducers 3A and 3B respectively connected to the differential unit 2.

<Speed Reducer>

Figure 4:
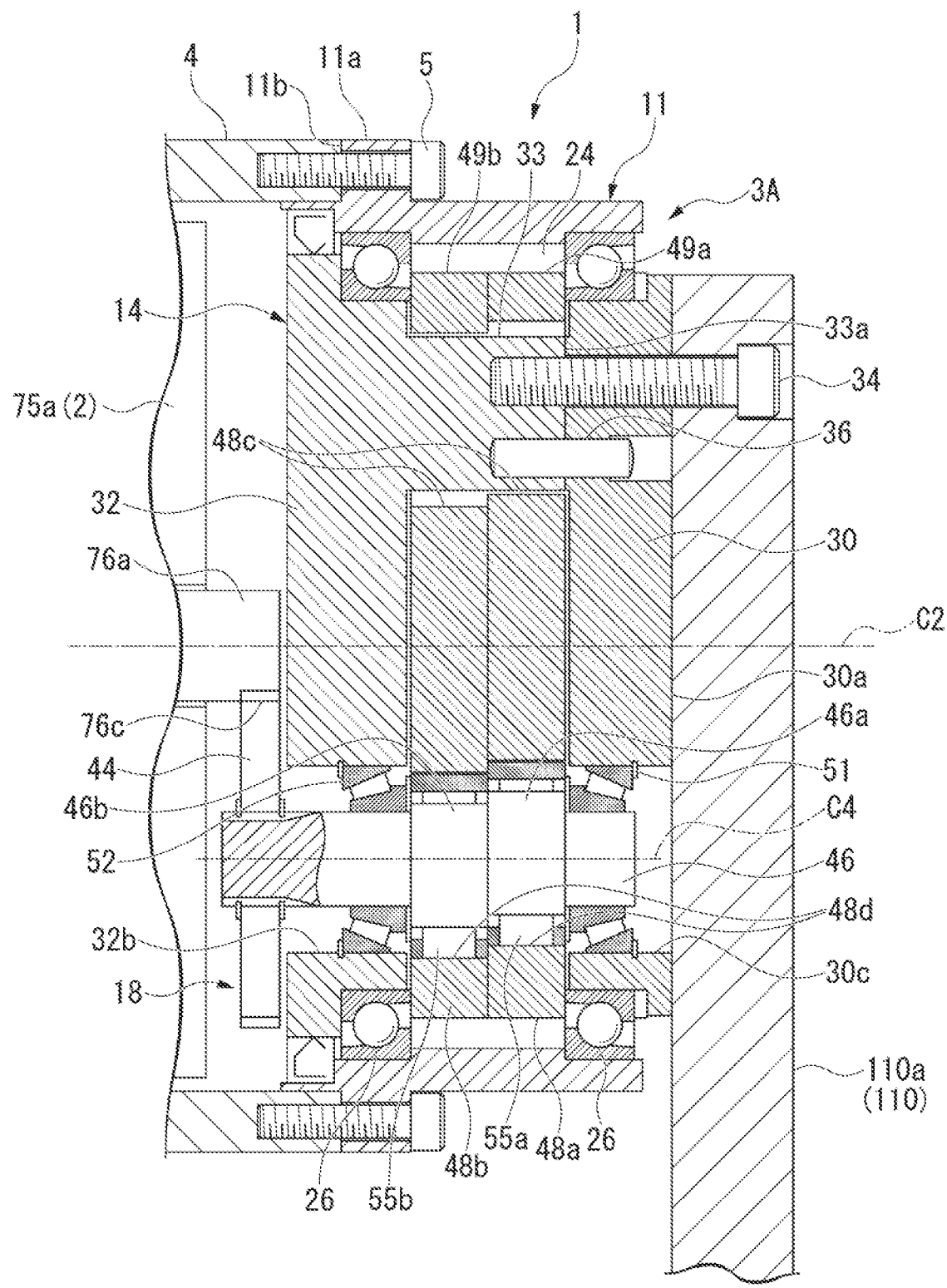
FIG. 4 schematically illustrates a configuration of a first speed reducer in the first embodiment.

FIG. 4 schematically shows the configuration of the first speed reducer 3A. The two speed reducers 3A and 3B have the same configuration, and are arranged symmetrically with respect to the third rotation axis C3. Therefore, in the following description, only the first speed reducer 3A will be described, and description of the second speed reducer 3B will be hereunder omitted. As shown in FIG. 4, the first speed reducer 3A includes a cylindrical casing 11, a carrier 14 disposed radially inside the casing 11, and a speed reducer output portion 18 that rotates the carrier 14 at a rotation speed reduced at a predetermined ratio with respect to the rotation speed of the first operation output shaft 76*a*.

<Casing>

An outer flange portion 11*a* projecting outward in the radial direction is integrally formed with the outer circumferential surface of the casing 11. The outer flange portion 11*a* has a rectangular section along the axial direction. The housing 4 is disposed on the end surface 11*b* of the outer flange portion 11*a* situated closer to the differential unit 2 (eft side in FIG. 4). The housing 4 is fastened and fixed to the outer flange portion 11*a* by bolts S. Internal teeth 24 are provided on an inner circumferential surface of the casing 11. The internal teeth 24 are pin-shaped (cylindrical) teeth provided on an inner peripheral surface of the case 11. Two or more internal teeth 24 are arranged at equal intervals in the circumferential direction.

<Carrier>

More specifically, the carrier 14 is rotatably supported by the casing 11 via a pair of main bearings 26 (one example of the bearings in the claims) disposed at a distance from each other in the axial direction of the casing 11. The main bearing 26 is, for example, an angular contact ball bearing. The carrier 14 is situated on the same axis as the casing 11 and the second rotation axis C2.

The carrier 14 includes a base plate portion 32 situated on the differential unit 2 side in the axial direction, and an end plate portion 30 disposed on a side of the base plate portion 32 away from the differential unit 2, and three cylindrical column portions 33 that are integrally molded with the base plate portion 32 and protrude out from the base plate portion 32 toward the end plate portion 30. The pillar portions 33 are arranged at equal intervals in the circumferential direction. The end plate portion 30 is disposed at tips 33*a* of the pillar portions 33. The attachment bracket 110*a* of the bucket 110 is arranged on one surface 30*a* of the end plate portion 30 facing away from the base plate portion 32. The end plate portion 30 and the attachment bracket 110a are fastened and fixed to the pillar portions 33 by bolts 34. In this state, a space having a predetermined width in the axial direction is formed between the base plate portion 32 and the end plate portion 30.

A pin 36 for positioning the end plate portion 30 with respect to the base plate portion 32 is provided slightly inner in the radial direction than the bolt 34 in the pillar portion 33. The pin 36 is disposed such that it spans the pillar portion 33 and the end plate portion 30. The pillar portion 33 and the base plate portion 32 are not necessary formed integrally with each other. In this case, the pillar portion 33 is fastened to the base plate portion 32. The configuration of the pillar portions 33 is not limited to such a columnar shape. The pillar portions 33 may be formed in any shape or configuration provided that they form a space having a certain width in the axial direction between the base portion 32 and the end plate portion 30.

The end plate portion 30 and the base portion 32 are formed with a plurality of through holes 30c and 32b (for example, three in this embodiment) into which a crankshaft 46 described later of the speed reducer output portion 18 is inserted. The through holes 30c and 32b are arranged at equal intervals in the circumferential direction.

<Speed Reducer Output Portion>

The speed reducer output portion 18 includes two or more transmission gears 44 (for example, three in this embodiment) that mesh with the teeth portion 76c of the first operation output shaft 76a, two or more crankshafts 46 (three in this embodiment) having one end fixed to the transmission gear 44, a first external gear 48a (an example of the external teeth member in the claims) and a second external gear 48b (an example of the external teeth member in the claims) that oscillatory rotate with the rotation of the crankshaft 46.

Since the transmission gears 44 are fixed to one end of the crankshafts 46, the rotation of the first operation output shaft 76a is transmitted to the crankshaft 46 via the transmission gear 44. The crankshafts 46 are arranged extending along the axial direction. In other words, the crankshaft 46 rotates on a crank rotation axis C4 (an example of the other rotation axis in the claims) parallel to the second rotation axis C2. The crankshaft 46 is rotatably supported by the end plate portion 30 via a first crank bearing 51. The crankshaft 46 is rotatably supported on the base plate portion 32 via a second crank bearing 52. The first crank bearing 51 and the second crank bearing 52 are, for example, tapered roller bearings.

At the center of the crankshaft 46 in the axial direction, a first eccentric portion 46a and a second eccentric portion 46b disposed eccentrically from the axial center of the crankshaft 46 are provided. The first and second eccentric portions 46a, 46b are disposed adjacent to each other in the axial direction between the first crank bearing 51 and the second crank bearing 52. The first eccentric portion 46a is disposed adjacent to the first crank bearing 51. The second eccentric portion 46b is disposed adjacent to the second crank bearing 52. The first eccentric portion 46a and the second eccentric portion 46b are out of phase with each other. These crankshafts 46 are inserted into the through hoes 30c and 32b in the end plate portion 30 and the base plate portion 32, respectively. That is, the crankshafts 46 are abo arranged at equal intervals in the circumferential direction like the through holes 30c and 32b.

A first roller bearing 55a is attached to the first eccentric portion 46a of the crankshaft 46. A second roller bearing 55b is attached to the second eccentric portion 46b. The first roller bearing 55a is, for example, a cylindrical roller bearing. The first roller bearing 55a includes a plurality of rollers 56 and a cage 57 for holding the plurality of rollers 56. Since the second roller bearing 55b has the same configuration as the first roller bearing 55a, detailed description thereof will be omitted. The first external gear 48a and the second external gear 48b are oscillatory rotated in conjunction with the rotation of the crankshaft 46 via the roller bearings 55a and 55b.

The first and second external gears 48a, 48b are disposed in a space between the base plate portion 32 of the carrier 14 and the end plate portion 30. The first external gear 48a and the second external gear 48b have external teeth 49a and 49b respectively that mesh with the internal teeth 24 of the casing 11. In the first external gear 48a and the second external gear 48b, formed are a first through hole 48c into which the pillar portion 33 is inserted and second through holes 48d into which the eccentric portions 46a and 46b of the crankshaft 46 are inserted.

The first eccentric portion 48a of the crankshaft 46 and the first roller bearing 55a are inserted into the second through hole 48d of the first external gear 48a. The second eccentric portion 46b of the crankshaft 46 and the second roller bearing 55b are inserted into the second through hole 48d of the second external gear 48b. The first eccentric portion 46a and the second eccentric portion 46b are oscillatory rotated by the rotation of the crankshaft 46, and thus the first external gear 48a and the second external gear 48b are oscillatory rotated while they mesh with the internal teeth 24 of the casing 11.

<Operation of Drive Transmission Device>

Next, a description is given of an operation of the drive transmission device 1. When the motor 120 provided in the arm 109 is driven, the rotation of the motor shaft 120a is transmitted to the first bevel gear 71 in the drive transmission device 1 via the transmission shaft 121. The second bevel gear 72 that meshes with the first bevel gear 71 is then rotated. The differential case 73 fixed to the second bevel gear 72 is thus rotated. Then, the pinion gear 74 is rotated about the second rotation axis C2. As a result, the pair of side gears 75a, 75b meshing with the pinion gear 74 are rotated.

Of the pair of side gears 75a, 75b, the rotation of the first side gear 75a is transmitted to the first speed reducer 3A via the first operation output shaft 76a. Of the pair of side gears 75a, 75b, the rotation of the second side gear 75b is transmitted to the second speed reducer 3B via the second operation output shaft 76b. The operation of the first speed reducer 3A among the two speed reducers 3A and 3B will be now described.

In the first speed reducer 3A, the transmission gear 44 that meshes with the first operation output shaft 76a is rotated by the rotation of the first operation output shaft 76a. Thus, the crankshaft 46 is integrally rotated with the transmission gear 44 about the crank rotation axis C4. When the crankshaft 46 is rotated, the first external gear 48a is rotated while meshing with the internal teeth 24 as the first eccentric portion 46a oscillatory moves. As the second eccentric portion 46b oscillatory moves, the second external gear 48b is rotated while meshing with the internal teeth 24. That is, the crankshaft 46 rotates on the crank rotation axis C4 and revolves around the second rotation axis C2.

In the present embodiment, the pillar portion 33 penetrating the first through ho 48c of the external gears 48a and 48b is fixed in a predetermined position together with the base plate portion 32. As a result, the carrier 14 is rotated about the second rotation axis C2 relative to the casing 11 at a rotation speed slower than that of the first operation output shaft 76a. The other end 109b of the arm 109 in the longitudinal direction is fixed to the casing 11 via the housing 4. The attachment bracket 110a for the bucket 110 is fixed to the end plate 30 of the carrier 14. Thus, by driving the motor 120 provided in the arm 109, the bucket 110 is rotationally moved about the second rotation axis C2 relative to the arm 109.

That is, the operation output shafts 76a, 76b of the speed reducers 3A, 3B are input shafts to which the rotation of the motor shaft 120a is inputted via the differential unit 2. In other words, the operation output shafts 76a, 76b are connected to the drive shaft of the differential unit 2. The carrier 14 is the output shaft that decelerates the rotation of the operation output shaft 76a, 76b and outputs the decelerated rotation to the bucket 110.

Here, the rotation of the motor shaft 120a of the motor 120 is transmitted to the two speed reducers 3A, 3B via the transmission shaft 121 and the differential unit 2. The outputs of these two speed reducers 3A, 3B are transmitted to the bucket 110. Meshing timings of the components in the two speed reducers 3A, 3B may differ due to a slight formation error of the components and an assembly error. Therefore, at the time of an initial operation of the differential device 2 (at the time of an initial operation of the drive transmission device 1), loads applied to the operation output shafts 76a, 76b connected to the speed reducers 3A, 3B respectively may be different. In such a case, there is a high possibility that the speed reducers 3A, 3B continue to be driven with the load difference therebetween.

The pinion gear 74 of the differential device 2 is supported by the differential case 73 such that it is rotatable about the third rotation axis C3. Thus, even when the loads applied to the operation output shafts 76a, 76b are different, the pinion gear 74 is rotated about the third rotation axis C3 and the difference in the loads to the operation output shafts 76a, 76b is absorbed. Thereafter loads are equally applied to the two operation output shafts 76a and 76b, and the rotation of the transmission shaft 121 is transmitted to the speed reducers 3A and 3B in this state.

As described above, in the above first embodiment, the drive transmission device 1 includes the differential unit 2 to which the rotation of the motor 120 is transmitted, and the two speed reducers 3A and 3B that decelerate the rotations of the operation output shafts 76a and 76b of the differential device 2. In the two speed reducers 3A and 3, the rotation axis (second rotation axis C2) of the operation output shafts 76a, 76b respectively that serve as the input shaft and the rotation axis (second rotation axis C2) of the carrier 14 that serves as the output shaft are parallel to each other (extend in the same rotation axis direction). The two speed reducers 3A, 3B are arranged such that they oppose each other in the axial direction (direction parallel to the second rotation axis C2). Therefore, for the singe differential unit 2, the two speed reducers 3A and 3B to which the rotation of the differential unit 2 is transmitted can be arranged in a space-saving manner. In this way, the size of the drive transmission device 1 can be reduced. Moreover, by providing the two speed reducers 3A and 3B, load can be distributed to these two speed reducers 3A and 3B. Therefore, it is possible to obtain a sufficient mechanical strength for the drive transmission device 1.

The differential unit 2 is disposed between the two speed reducers 3A and 3B. In this way, a limited space is effectively used for arranging the differential unit 2 and the two speed reducers 3A and 3B so that the drive transmission device 1 can be further reduced in size. As a result, the drive transmission device 1 can be arranged even in a narrow space such as the coupling portion between the arm 109 and the bucket 110. The differential unit 2 is used as a means for transmitting the rotation of the motor 120 to the two speed reducers 3A and 3B. Thus, loads are equally applied to the two operation output shafts 76a and 76b, and the rotation of the transmission shaft 121 is transmitted to the speed reducers 3A and 3B. Therefore, it is possible to prevent the speed reducers 3A and 3B from continuing to be driven with the load imbalance. As a result, the product life of the drive transmission device 1 can be extended.

The speed reducers 3A, 3B each include the cylindrical casing 11, the carrier 14 disposed radially inside the casing 11, and the speed reducer output portion 18 that rotates the carrier 14 at a rotation speed reduced at a predetermined ratio with respect to the rotation speed of the operation output shafts 76a, 76b that serve as the input shaft. The speed reducer output portion 18 includes the two or more crankshafts 46, and the first external gear 48a and second external gear 48b that oscillatory rotate in conjunction with the rotation of the crankshaft 46. With such two speed reducers 3A and 3B, a high output can be obtained at a high reduction ratio. Therefore, the boom 108, the arm 109, and the bucket 110 can be operated appropriately while reducing the size of the drive transmission device 1. In the speed reducers 3A, 3B, the internal gear 24 and the external gears 48a, 48b have a high contact ratio to each other, which improves the resistance of the drive transmission device 1 against overloads and impact loads. Consequently, it is possible to improve the resistance against overloads and impact loads on the coupling portion between the slewable upper structure 103 and the boom 108, the coupling portion between the boom 108 and the arm 109, and the coupling portion between the arm 109 and the bucket 110.

Second Embodiment

<Drive Transmission Device>

Figure 5:
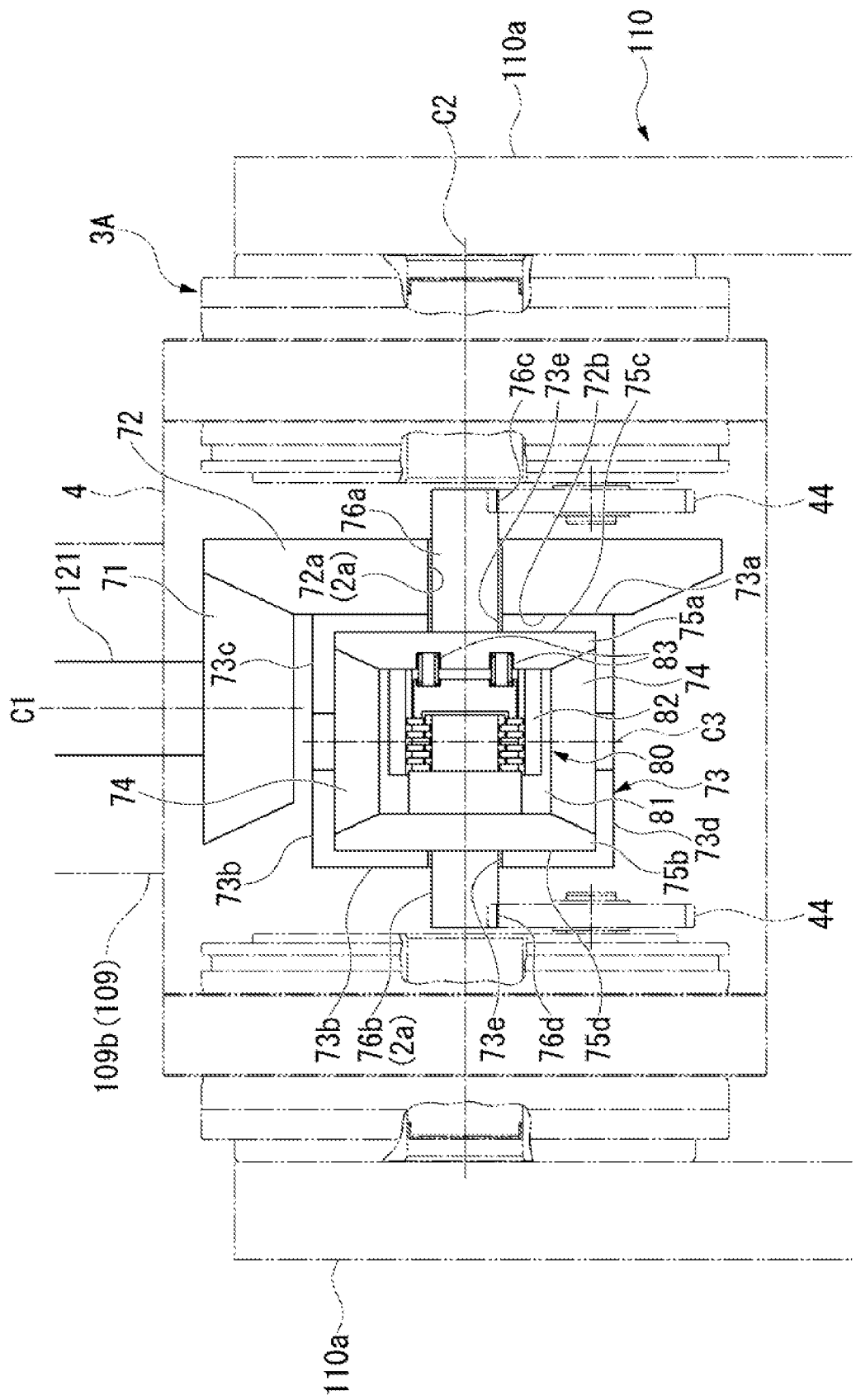
FIG. 5 schematically illustrates a configuration of a differential gear in a drive transmission device according to a second embodiment of the disclosure.

A second embodiment will now be described with reference to FIG. 5. Elements and components similar to those of the first embodiment are referred to using the same labels or referral numerals and description thereof will be omitted FIG. 5 schematically illustrates a configuration of a differential unit 202 in a drive transmission device 201 according to a second embodiment of the disclosure. FIG. 5 corresponds to FIG. 3 referred above. As shown in FIG. 5, the drive transmission device 201 includes a clutch mechanism 80 (an example of the overload protection device in the calms) disposed in the differential unit 202. This is different from the above first embodiment.

The clutch mechanism 80 is disposed in the differential case 73. The clutch mechanism 80 is provided such that it connects the two side gears 75a and 75b. The side gears 75a and 75b rotate integrally with the corresponding operation output shafts 76a and 76b. Thus, the clutch mechanism 80 connecting the two side gears 75a and 75b means the same as the clutch mechanism 80 connecting the operation output shafts 76a and 76b. The clutch mechanism 80 includes a clutch plate 81 and a pusher plate 82 facing each other in the second rotation axis C2 direction, and a spring 83 that presses the pusher plate 82 toward the clutch plate 81. In the second embodiment, for example, the clutch plate 81 is connected to the second side gear 75b, and the pusher plate 82 is arranged on the first side gear 75a side.

In this configuration, when a difference between loads applied to the two side gears 75a and 75b (operation output shafts 76a and 76b) is equal to or less than a predetermined value, the pusher plate 82 remains being pressed toward the clutch plate 81 by the spring 83. In this state, the clutch plate 81 and the pusher plate 82 are connected, and the two side gears 75a and 75b (operation output shafts 76a and 76b) are integrally rotated. Therefore, without operating the differential unit 2 (the pinion gear 74 is not rotated about the third rotation axis C3), the rotation of the motor shaft 120a is transmitted to the speed reducers 3A and 3B via the operation output shafts 76a and 76b.

Whereas when the difference in the load between the two side gears 75a and 75b (operation output shafts 76a and 76b) exceeds a predetermined value, the pusher plate 82 is separated from the clutch plate 81 against the spring force of the spring 83. As a result, the connection between the clutch plate 81 and the pusher plate 82 is released and the two side gears 75a and 75b (operation output shafts 76a and 76b) are relatively rotated. In this case, the differential unit 2 is operated to absorb the difference in load applied to the operation output shaft 76a and the operation output shaft 76b. After that, the rotation of the motor shaft 120a is transmitted to the speed reducers 3A and 3B via the operation output shafts 76a and 76b respectively.

As described above, in the above second embodiment, the two side gears 75a and 75b (operation output shafts 76a and 76b) are connected via the clutch mechanism 80. Therefore, in addition to the same advantageous effects as those of the first embodiment described above, for example, when the two speed reducers 3A and 3B are driven with almost no load difference, it is possible to prevent the differential unit 2 from operating unnecessarily. If the differential unit 2 works all the time, drive noise and slight vibration of the differential unit 2 increase, and the product life of the drive transmission device 1 is shortened. Therefore, the drive transmission device 201 provided with the clutch mechanism 80 can extend the product life as compared with the above first embodiment.

The present disclosure is not limited to the above embodiments but encompasses various modifications of the above embodiments not departing from the purport of the present disclosure. For example, in the above-described embodiment, the drive transmission devices 1, 201 for driving the bucket 110 relative to the arm 109 have been described with the case where the motor 120 is provided in the arm 109. Whereas when the boom 108 is driven relative to the slewable upper structure 103, the motor 120 may be provided in either the slewable upper structure 103 or the boom 108. When driving the arm 109 relative to the boom 108, the motor 120 may be provided in either the boom 108 or the arm 109.

In the above embodiments, described was the case where the excavator 100 is provided with the drive transmission devices 1, 201 for driving the boom 108, the arm 109, and the bucket 110 of the excavator 100, which is a construction machine. However, the drive transmission devices 1, 201 can be used for various devices without limitation. For example, when the drive transmission devices 1, 201 are provided to any other machines or devices other than the construction machine, various types of drive source can be adopted in stead of the motor 120. For example, although the motor 120 is an electric motor, it may be a hydraulic motor driven by hydraulic oil. An engine or the like can be adapted instead of the motor.

In the above-described embodiments, the case where the drive transmission device 1, 201 includes the two speed reducers 3A, 3B that reduce the rotation speed of the operation output shafts 76a, 76b and outputs the reduced rotation has been described. However, the disclosure is not limited to this, and instead of the speed reducers 3A, 3B, speed increasers that increase the rotation speed of the operation output shafts 76a, 76b respectively may be provided. Anything may be used provided that it changes the rotation speeds of the operation output shafts 76a, 76b, and the speed reducers are configured such that the input shaft and the output shaft are aligned in the same rotation axis direction, and the speed reducers are disposed such that they are opposed each other in the axial direction.

In the above-described embodiment, the case where the differential unit 2 is provided as the transmission portion for transmitting the rotation of the motor shaft 120a to the speed reducers 3A and 3B has been described. However, the disclosure is not limited to this, and any transmission portion may be used provided that it can transmit the rotation of the motor shaft 120a to the speed reduces 3A and 3B.

In the above embodiments, the speed reducers 3A, 3B each includes the cylindrical casing 11, the carrier disposed radially inside the casing 11, and the speed reducer output portion 18 that rotates the carrier 14 at a rotation speed reduced at a predetermined ratio with respect to the rotation speed of the motor shaft 120a. The deceleration output unit 18 has been described as a so-called eccentric oscillating speed reducer that includes the two or more crankshafts 46, and the first external gear 48a and second external gear 48b that oscillatory rotate in conjunction with the rotation of the crankshaft 46. However, the configuration of the speed reducers 3A, 3B is not limited to this, and the speed reducers 3A, 3B may have any configuration provided that it includes a first member (for example, the casing 11) and a second member (for example, the carrier 14) that rotate relative to each other about the same second rotation axis C2, and at least one crankshaft (for example, the crankshaft 46) that is disposed between the first and second members and is rotated about a rotation axis along the second rotation axis C2 by the rotation of the input shaft (for example, the operation output shafts 76a, 76b). The speed reducer output portion 18 may be an eccentric oscillating speed reducer that reduces the rotation speed of the crankshaft and transmits it to the second member to rotate the second member relative to the first member at a reduced rotation speed.

For example, an eccentric oscillating speed reducer having a single crankshaft will be specifically described. The speed reducer in this case has a so-called center crankshaft coaxial with the second rotation axis C2 as the crankshaft. In conjunction with the rotation of the center crankshaft, the first external gear 48a and the second external gear 48b are oscillatory rotated.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:

1. A drive transmission device, comprising:
 a single transmission portion to which rotation of a drive source generating a rotational force is transmitted; and
 two speed changers each having an input shaft and an output shaft, the input shaft being coupled to the transmission portion, the output shaft changing a speed of rotation of the input shaft and outputting a speed-changed rotation,
 wherein the input shaft and the output shaft are aligned in a same rotation axis direction and the two speed changers are opposed each other in the rotation axis direction, wherein the transmission portion is disposed between the two speed changers, wherein the transmission portion includes a differential unit that includes a ring gear to which the rotation of the drive source is transmitted, wherein the input shaft is coupled to a drive shaft of the differential unit, wherein the drive transmission device further comprises an overload protection device that is disposed in a differential case of the differential unit and that connects the input shafts of the two speed changers, and wherein the overload protection device allows rotations of the input shafts relatively to each other when a difference in torque between the input shafts exceeds a predetermined value.

2. The drive transmission device of claim 1, wherein the two speed changers each include at least one crankshaft that receives the rotation of the input shaft and rotates about another rotation axis parallel to the rotation axis direction, wherein the two speed changers function as eccentric oscillating type speed changers, each of the eccentric oscillating type speed changers decelerating the rotation of the crankshaft and transmitting the decelerated rotation to the output shaft so that the output shaft is rotated at a reduced speed compared to the input shaft.

3. The drive transmission device of claim 2, wherein the crankshaft includes two or more crankshafts, wherein the two speed changers each further include:

an external teeth member having external teeth that are oscillatory rotated about the rotation axis by the crankshafts; and a casing having internal teeth that mesh with the external teeth, wherein the output shaft rotatably supports the crankshafts and is rotatably supported by the casing via a bearing, and wherein the output shaft is a carrier that is rotated relative to the casing at a reduced speed by the crankshafts.

4. A construction machine, comprising:

a first member having a drive source that generates a rotational force; and a second member coupled to the first member via a drive transmission device such that the second member is rotatable about a rotation axis, wherein the drive transmission device includes:

a transmission portion to which a rotational force of the drive source is transmitted; and two speed changers changing a speed of rotation of the transmission portion and outputting the rotation to the second member, wherein the two speed changers each include an input shaft coupled to the transmission portion and an output shaft coupled to the second member, wherein the input shaft and the output shaft are aligned along the rotation axis, and the two speed changers are opposed to each other in the rotation axis direction.

* * * * *